(12) United States Patent
Inoue et al.

(10) Patent No.: US 9,478,800 B2
(45) Date of Patent: Oct. 25, 2016

(54) NEGATIVE ELECTRODE ACTIVE MATERIAL FOR NONAQUEOUS ELECTROLYTE SECONDARY BATTERIES

(71) Applicant: Mitsui Mining & Smelting Co., Ltd., Tokyo (JP)

(72) Inventors: Daisuke Inoue, Ageo (JP); Yanko Marinov Todorov, Ageo (JP); Shinya Kagei, Ageo (JP)

(73) Assignee: Mitsui Mining & Smelting Co., Ltd., Tokyo (JP)

( * ) Notice: Subject to any disclaimer, the term of this patent is extended or adjusted under 35 U.S.C. 154(b) by 0 days.

(21) Appl. No.: 14/400,670

(22) PCT Filed: May 15, 2013

(86) PCT No.: PCT/JP2013/063535
§ 371 (c)(1),
(2) Date: Nov. 12, 2014

(87) PCT Pub. No.: WO2013/172378
PCT Pub. Date: Nov. 21, 2013

(65) Prior Publication Data
US 2015/0132645 A1    May 14, 2015

(30) Foreign Application Priority Data

May 15, 2012    (JP) .................................. 2012-111752

(51) Int. Cl.
| | |
|---|---|
| *H01M 4/133* | (2010.01) |
| *H01M 4/134* | (2010.01) |
| *H01M 4/36* | (2006.01) |
| *H01M 4/38* | (2006.01) |
| *H01M 4/587* | (2010.01) |

(Continued)

(52) U.S. Cl.
CPC ............. *H01M 4/364* (2013.01); *H01M 4/133* (2013.01); *H01M 4/134* (2013.01); *H01M 4/366* (2013.01); *H01M 4/38* (2013.01); *H01M 4/386* (2013.01); *H01M 4/587* (2013.01); *H01M 4/622* (2013.01); *H01M 2004/021* (2013.01); *H01M 2004/027* (2013.01); *Y02E 60/122* (2013.01)

(58) Field of Classification Search
CPC ............................ H01M 4/386; H01M 4/366
See application file for complete search history.

(56) References Cited

U.S. PATENT DOCUMENTS

| | | | |
|---|---|---|---|
| 2005/0214644 A1 | 9/2005 | Aramata et al. | |
| 2006/0003227 A1* | 1/2006 | Aramata ............. | H01M 4/0421 |
| | | | 429/218.1 |

(Continued)

FOREIGN PATENT DOCUMENTS

| | | |
|---|---|---|
| JP | 11250896 A | 9/1999 |
| JP | 11354104 A | 12/1999 |

(Continued)

*Primary Examiner* — Maria J Laios
*Assistant Examiner* — Robert S Carrico
(74) *Attorney, Agent, or Firm* — The Webb Law Firm

(57) ABSTRACT

In order to propose a new negative electrode for nonaqueous electrolyte secondary batteries having excellent dispersibility even with a negative electrode active material having a relatively small particle size, there is proposed a negative electrode active material for nonaqueous electrolyte secondary batteries, the negative electrode active material containing silicon and having negative electrode active material particles that have a D50 based on a volume-based particle size distribution obtainable by measurement by a laser diffraction scattering type particle size distribution analysis method, of 0.1 μm to 5.0 μm, and include a surface layer containing oxygen, silicon and carbon on the entire surface or a portion of the active material surface.

13 Claims, 1 Drawing Sheet

(51) Int. Cl.
*H01M 4/62* (2006.01)
*H01M 4/02* (2006.01)

(56) References Cited

U.S. PATENT DOCUMENTS

| | | | |
|---|---|---|---|
| 2009/0226819 A1* | 9/2009 | Ihara | H01M 4/366 |
| | | | 429/331 |
| 2010/0243951 A1 | 9/2010 | Watanabe et al. | |
| 2010/0285367 A1* | 11/2010 | Matsui | H01M 4/131 |
| | | | 429/231.95 |
| 2011/0159368 A1* | 6/2011 | Hirose | H01M 4/134 |
| | | | 429/219 |
| 2012/0328945 A1 | 12/2012 | Hirose et al. | |

FOREIGN PATENT DOCUMENTS

| | | |
|---|---|---|
| JP | 2000285919 A | 10/2000 |
| JP | 200422433 A | 1/2004 |
| JP | 2005310759 A | 11/2005 |
| JP | 2006269216 A | 10/2006 |
| JP | 4033720 B2 | 1/2008 |
| JP | 2008123814 A | 5/2008 |
| JP | 2010225494 A | 10/2010 |
| JP | 201149046 A | 3/2011 |
| JP | 201176741 A | 4/2011 |
| JP | 2011198614 A | 10/2011 |
| JP | 20138584 A | 1/2013 |

\* cited by examiner

NEGATIVE ELECTRODE ACTIVE MATERIAL FOR NONAQUEOUS ELECTROLYTE SECONDARY BATTERIES

CROSS-REFERENCE TO RELATED APPLICATIONS

This application is the United States national phase of International Application No. PCT/JP2013/063535 filed May 15, 2013, and claims priority to Japanese Patent Application No. 2012-111752 filed May 15, 2012, the disclosures of which are hereby incorporated in their entirety by reference.

TECHNICAL FIELD

The present invention relates to a negative electrode active material that can be used in nonaqueous electrolyte secondary batteries such as lithium secondary batteries.

BACKGROUND ART

A negative electrode for nonaqueous electrolyte secondary batteries is generally produced by mixing particles of an active material formed from a material into which lithium ions can be inserted by charging, with a binder, a conductive material and a solvent, applying the mixture thus obtained on the surface of a current collector, drying the mixture to form a coating film, and further subjecting the coating film to press processing.

In recent years, along with the development in applications such as electric vehicles and smart phones, there is an increasing demand for capacity increase and lengthening of the service life of batteries. Currently, most of the negative electrodes of commercially available batteries use graphite as the negative electrode active material; however, this active material has already reached the theoretical limit in terms of capacity, and it is now necessary to develop new negative electrode active materials. One of the promising candidates thereof is active materials containing silicon (also referred to as "silicon-based active materials").

Silicon-based active materials have a potential that the capacity per mass is 5 to 10 times that of graphite. However, on the other hand, silicon-based active materials have a problem that electron conductivity is not so high compared with graphite. Thus, it has been hitherto suggested, in order to increase the electron conductivity of silicon-based active materials, to impart electron conductivity between an additive current collector and the active material by, for example, adding a conductive auxiliary agent.

For example, it has been proposed in Patent Document 1 to attach particles of a metal material having a particle size of 0.0005 μm to 10 μm to the surfaces of silicon-based active material particles.

Furthermore, it has been proposed in Patent Document 2 to coat the periphery of core particles containing silicon with a silicon solid solution such as $Mg_2Si$, CoSi or NiSi, and to further coat the surface with a conductive material such as graphite or acetylene black.

Furthermore, in regard to the silicon-based active materials, suggestions have been made to the effect of enhancing the battery characteristics by controlling the particle size distribution or the particle size.

For example, Patent Document 3 is described, in connection with active material particles containing silicon and/or a silicon alloy, to the effect that when the average particle size of the active material particles is adjusted to from 1 μm to 10 μm, and the particle size distribution is adjusted to a particle size distribution in which 60% by volume or more of the particles have a particle size in the range of from 1 μm to 10 μm, the volume of the active material particles expands and contracts along with the storage and release of lithium resulting from charge and discharge, and thereby an increase in the contact resistance between the active material particles is suppressed.

Patent Document 4 discloses, in connection with a negative electrode active material containing silicon particles, that the active material particles have an average particle size in the range of 7.5 μm to 15 μm, and have a particle size distribution in which 60% by volume or more of the particles have a particle size in the range of average particle size ±40%. It is disclosed to the effect that when the average particle size of the active material particles is adjusted to 7.5 μm or more, the number of particles per volume that exist in the thickness direction of the active material layer becomes smaller, and therefore, the number of particles that should be brought into contact with each other in order to obtain current collectability becomes smaller, so that satisfactory current collectability can be obtained.

Patent Document 5 discloses active material particles containing silicon, which have an average particle size of from 5 μm to 25 μm. When the average particle size of the active material particles is adjusted to 5 μm or more, the original specific surface area of the active material can be reduced. It is described to the effect that since the contact area between the electrolyte and the newly generated surfaces of the active material can be reduced thereby, the effect of enhancing the cycle characteristics and the effect of suppressing swelling of the active material are increased.

Furthermore, in regard to the silicon-based active materials, it has also been suggested to conduct a surface treatment with a silane coupling agent, in order to enhance the cycle characteristics of batteries.

For example, Patent Document 6 describes that, in order to enhance the cycle characteristics of batteries, decomposition caused by the electrolyte at the active material surface is suppressed by surface treating the active material surface with a silane compound such as a silane coupling agent.

Furthermore, Patent Document 7 discloses, in regard to an electrode for lithium ion secondary batteries having a current collector and an active material layer that is formed on the surface of the current collector and contains an active material and a binder polymer, a technology of preventing detachment of the active material caused by expansion and contraction of the electrode at the time of charging and discharging, by chemically bonding the active material and the binder polymer using a silane coupling agent and thereby making the electrode structure strong and stable.

CITATION LIST

Patent Document

Patent Document 1: JP 11-250896 A
Patent Document 2: JP 2000-285919 A
Patent Document 3: Japanese Patent No. 4033720 (JP 2004-22433)
Patent Document 4: JP 2007-234336 A
Patent Document 5: JP 2008-123814 A
Patent Document 6: JP 11-354104 A
Patent Document 7: JP 2011-049046 A In the case of using a silicon-based active material as a negative electrode active material, as one of the means for enhancing the cycle characteristics, it can be considered to reduce the particle size of the silicon-based active material, and to thereby enhance reactivity of the particles. However, when the particles of the silicon-based active material are made smaller, dispersibility of the active material particle powder (uniform miscibility) is decreased at the time of slurry production. Therefore, the negative electrode active material particles are unevenly distributed in the electrode coating film, and as a result, it was found that the capacity retention of the battery is decreased thereby.

Thus, an object of the present invention is to provide a new negative electrode for nonaqueous electrolyte secondary batteries, in which even a negative electrode active material having a relatively smaller particle size has excellent dispersibility.

SUMMARY OF THE INVENTION

The present invention is to propose a silicon-containing negative electrode active material for nonaqueous electrolyte secondary batteries, which contains negative electrode active material particles having a D50 based on a volume-based particle size distribution obtainable through an analysis by a laser diffraction scattering type particle size distribution analysis method, of 0.1 µm to 5.0 µm, and having a surface layer containing oxygen, silicon and carbon on the entire surface or a portion of the active material surface.

Since the negative electrode active material for nonaqueous electrolyte secondary batteries proposed by the present invention has a relatively small particle size such that the D50 is 0.1 µm to 5.0 µm, the active material has excellent reactivity, and the cycle characteristics of the battery can be enhanced. Furthermore, nevertheless, since the negative electrode active material has a surface layer containing oxygen, silicon and carbon on the entire surface or a portion of the active material surface, an electrode in which the active material particles uniformly exist with high dispersibility can be formed, so that capacity retention of the battery can be increased.

MODE(S) FOR CARRYING OUT THE INVENTION

Present Negative Electrode Active Material

Figure 1:
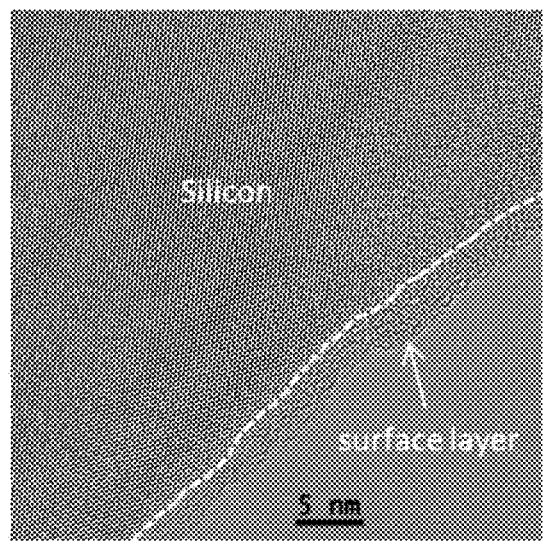
FIG. 1 is a cross-sectional photograph obtained, in relation to the negative electrode obtained in Example 2, by observing a surface area of the active material particles in a vertical cross-section of the active material layer using a transmission electron microscope.

The negative electrode active material for nonaqueous electrolyte secondary batteries related to an exemplary embodiment of the present invention (hereinafter, referred to as "present negative electrode active material") is a negative electrode active material containing silicon, and is a negative electrode active material containing negative electrode active material particles (hereinafter, referred to as "present negative electrode active material particles") having a surface layer containing oxygen, silicon and carbon on the entire surface or a portion of the active material surface.

The present negative electrode active material contains, as a main component, a silicon-containing material such as, for example, pure silicon; a silicon oxide such as SiO or $SiO_2$; a silicon alloy such as $SiB_4$, $SiB_6$, $Cu_5Si$, $FeSi_2$, or $Mg_2Si$; or a silicon compound such as $Si_3N_4$ or SiC.

At this time, it is implied that the present negative electrode active material also includes materials obtained by incorporating one or two or more elements selected from the group consisting of Ni, B, Co, Ti, Fe, In, Ag, Cu and Nb to these silicon oxides, silicon alloys and silicon compounds. In that case, the elements may be contained in any state, and for example, the elements may be contained in a solid solution state.

The present negative electrode active material may also be a material in which one kind or two or more kinds of elements selected from the group consisting of transition metal elements, the semi-metal elements or metal elements of Group 3, the semi-metal elements or metal elements of Group 4 (provided that silicon is excluded), and the non-metal or semi-metal elements of Group 5 (these are collectively referred to as "additive elements") are incorporated into one of the silicon-containing materials described above. Preferably, the negative electrode active material may also be a material in which the relevant additive elements are solid-solubilized in one of the silicon-containing materials (referred to as "silicon solid solution"). Also, the negative electrode active material may also be a mixture of such a silicon solid solution and the silicon-containing materials.

When the particle size of the present negative electrode active material is decreased, the specific surface area is increased. Therefore, deterioration of the negative electrode active material caused by side reactions such as decomposition of the electrolyte at the time of charging and discharging, is likely to occur. Thus, when the additive elements such as described above are solid-solubilized, the extent of deterioration of the negative electrode active material caused by side reactions such as decomposition of the electrolyte is decreased, and corrosion can be suppressed. Furthermore, generation of side reaction products not only causes electrode swelling, but also causes troubles such as consumption of lithium that is active in the electrode reaction. From such a point of view, among the additive elements described above, boron, phosphorus and iron are preferred, and among them, boron is particularly preferred from the viewpoint of suppressing the reactivity with the electrolyte. In this case, it may be considered that as a result of boron being solid-solubilized into silicon, many holes are introduced into a solid solution. Since the side reactions of a electrolyte on a negative electrode active material are mainly electrophilic reactions, it may be considered that when many holes exist in the negative electrode active material, the side reactions thereof are reduced.

When an additive element such as boron (B) is solid-solubilized, the content of the relevant additive element is preferably 0.01 atom % to 10 atom %, particularly preferably 1 atom % or more, or 6 atom % or less, and among others, preferably 1 atom % or more, or 3 atom % or less. These values are fairly higher than the conventional cases, and include even a range beyond the theoretical values.

In order to increase the amount of solid solution of the additive element, for example, the increase can be realized by micronizing the active material by a steam explosion atomization method that will be described below, or by micronizing the active material by a water atomization method. However, the present invention is not intended to be limited to such methods.

When an additive element such as boron (B) is solid-solubilized, it is preferable to precipitate the relevant additive element on the grain boundaries by performing a heat treatment, from the viewpoint of enhancing the battery characteristics.

As described above, the present negative electrode active material may be a material containing the above-described silicon-containing material as a main component, may be a material containing the silicon solid-solution as a main component, or may be a material containing a mixture of the silicon solid solution and the silicon-containing material as a main component. Furthermore, the present negative electrode material may also be a material containing a mixture of these and a silicon alloy as a main component.

In this case, examples of the relevant silicon alloy include alloys of silicon and transition metals, and examples of the relevant transition metal include iron, nickel, titanium, cobalt, and copper. Also, the silicon alloy may be an alloy between silicon and niobium.

The term "main component" according to the present invention includes the meaning that components other than the main component may be included. The content of the main component is preferably 90 mass % or more, particularly preferably 95 mass % or more, and among others, preferably 97 mass % or more.

(Surface Layer)

The present negative electrode active material particles are negative electrode active material particles having a surface layer containing oxygen, silicon and carbon, on the entire surface or a portion of the active material surface.

The relevant surface layer may exist so as to cover the entire surface of the active material surface, or may exist partially on the active material surface, so that there may be areas where the surface layer does not exist.

Such a surface layer can be formed by conducting a surface treatment with a silane coupling agent after the negative electrode active material containing silicon is produced, and heating, if necessary, the surface at a temperature higher than 300° C. after the surface treatment. However, this heating may be carried out in a stage of producing the present negative electrode active material, or may be carried out in a stage of producing a negative electrode by mixing the negative electrode active material with a binder and the like.

At this time, a significant amount of nitrogen (N) contained in the silane coupling agent is volatilized by the heating at a temperature higher than 300° C.

The thickness of the surface layer is preferably a thickness of 0.1 nm to 10 nm. When the thickness of such a surface layer is 0.1 nm or more, dispersibility of the present negative electrode active material can be sufficiently increased, and when the thickness is 10 nm or less, electrical resistance can be sufficiently suppressed.

From such a viewpoint, the thickness of the surface layer is particularly more preferably 0.5 nm or more, or 10 nm or less, and among others, even more preferably 1 nm or more, or 7 nm or less.

Meanwhile, the thickness of the surface layer can be obtained, as will be described below, by observing a vertical cross-section of the active material layer of the negative electrode using a transmission electron microscope or the like, measuring the thickness of the surface layer at arbitrary 10 sites, and calculating the average value thereof.

Furthermore, the amount of carbon in the relevant surface layer is preferably 0.01 wt % to 0.5 wt %, more preferably 0.015 wt % or more, or 0.4 wt % or less, and among others, more preferably 0.02 wt % or more, or 0.2 wt % or less, of the negative electrode active material particles.

When the amount of carbon in the surface layer is 0.01 wt % or more, dispersibility of the present negative electrode active material can be further increased, and when the amount of carbon is 0.5 wt % or less, electrical resistance can be more effectively suppressed.

The amount of carbon in the surface layer can be adjusted by the amount of attachment of the silane coupling agent.

(Intermediate Layer)

The present negative electrode active material particles may include an intermediate layer containing silicon dioxide between the active material surface and the surface layer. At this time, the relevant intermediate layer may be formed on the entire surface or a portion of the active material surface, and may also include the surface layer described above on the entire surface or a portion of the intermediate layer. However, it is acceptable not to have this intermediate layer.

A main component of this intermediate layer is preferably silicon oxide ($SiO_2$).

Also, the thickness of the intermediate layer is preferably 0.1 nm to 2.0 nm.

(Content of Impurities)

The present negative electrode active material is preferably such that the total content of iron (Fe), aluminum (Al), calcium (Ca), phosphorus (P) and oxygen (O) is 0.1 mass % to 2.5 mass %.

In regard to the present negative electrode active material, when the total content of iron (Fe), aluminum (Al), calcium (Ca), phosphorus (P) and oxygen (O) is 0.1 mass % or more, because the purity of silicon is not excessively high, a decrease in electrical conductivity can be suppressed. Furthermore, when the total content is 2.5 mass % or less, a high capacity of the negative electrode active material can be maintained.

From such a viewpoint, in regard to the present negative electrode active material, the total content of iron (Fe), aluminum (Al), calcium (Ca), phosphorus (P) and oxygen (O) is particularly more preferably 0.1 mass % or more, or 2 mass % or less, and among others, more preferably 0.5 mass % or more, or 1 mass % or less.

In regard to the present negative electrode active material, the total content of iron (Fe), aluminum (Al), calcium (Ca), phosphorus (P) and oxygen (O) can be adjusted by, for example, adjustment of the purity of the silicon ingot used as a raw material, selection of the crucible at the time of atomization, and adjustment of the particle size.

(Particle Shape)

The particle shape of the present negative electrode active material is not particularly limited. For example, a spherical shape, a polyhedral shape, a spindle shape, a plate shape, a scale shape, or an amorphous shape, or a combination of those can be used. For example, it has been confirmed that the negative electrode active material becomes spherical by gas atomization, and when the active material is pulverized by a jet mill or the like, since particles are split along the grain boundaries, the particles acquire amorphous shapes.

(D50)

The laser diffraction scattering type particle size distribution analysis method is an analysis method of assuming an aggregated granule as a single particle (aggregated particle), and calculating the particle size thereof. The D50 according to that analysis method means the 50% cumulative volume particle size, that is, the diameter of cumulative 50% from the finer side of the cumulative percentage notation of the particle size measurement values calculated relative to the volume in a volume-based particle size distribution chart.

The D50 of the present negative electrode active material is preferably 0.1 µm to 5.0 µm, more preferably 4.0 µm or less, and among others, particularly more preferably 3.5 µm or less. When the particle size is adjusted to such a range, reactivity of the negative electrode active material particles is increased so that the cycle characteristics can be enhanced. Also, excellent uniform reactivity of the electrode can be obtained, and the cycle characteristics can also be enhanced thereby. Furthermore, a decrease in the volume energy density can be suppressed.

In order to adjust the D50 of the present negative electrode active material to the range described above, for example, it is desirable to micronize the active material by a steam explosion atomization method that will be described below, and to conduct pulverization by a jet mill or the like at the same time. However, the present invention is not intended to be limited to such a production method.

(Amount of Water)

The amount of water (120° C. to 300° C.) per unit specific surface area of the present negative electrode active material particles is preferably 50 ppm/($m^2$/g) to 250 ppm/($m^2$/g); particularly preferably 70 ppm/($m^2$/g) or more, or 230 ppm/($m^2$/g) or less; and among others, more preferably 90 ppm/($m^2$/g) or more, or 200 ppm/($m^2$/g) or less.

The amount of water (120° C. to 300° C.) at the surface of the present negative electrode active material particles can be adjusted by the amount of attachment of a silane coupling agent.

(Specific Surface Area)

The specific surface area of the present negative electrode active material is preferably 1.0 $m^2$/g to 15.0 $m^2$/g; particularly 1.5 $m^2$/g or more, or 14.0 $m^2$/g or less; among others, particularly 1.5 $m^2$/g or more, or 12.0 $m^2$/g or less; and even more preferably 10.0 $m^2$/g or less.

When the specific surface area is adjusted to such a range, reactivity of the negative electrode active material particles is increased, and thus cycle characteristics can be enhanced.

Meanwhile, in order to adjust the specific surface area of the present negative electrode active material to the range described above, for example, it is desirable to micronize the active material by a steam explosion atomization method that will be described below, and to conduct pulverization using a jet mill or the like at the same time. However, the present invention is not intended to be limited to such a production method.

(Method for Producing Present Negative Electrode Active Material)

The present negative electrode active material can be produced by heating the silicon-containing material to obtain a molten liquid, or mixing the additive elements to the silicon-containing material and heating the mixture to obtain a molten liquid, or heating the silicon-containing material to obtain a molten liquid and adding the additive elements to this molten liquid to obtain a molten liquid; subsequently micronizing the active material by an atomization method or the like, or after obtaining the molten liquid, casting the molten liquid by a roll casting method; optionally performing pulverization and classification to thereby adjust the particle size; and then surface treating the particles using a silane coupling agent or the like (also referred to as "silane coupling treatment").

Regarding the silicon-containing material as a raw material, it is preferable to use a silicon-containing material having an amount of surface water per unit specific surface area (200° C. to 300° C.) of 0.1 ppm/($m^2$/g) to 20 ppm/($m^2$/g), more preferably 0.5 ppm/($m^2$/g) or more, or 15 ppm/($m^2$/g) or less, and among others, 1.0 ppm/($m^2$/g) or more, or 10 ppm/($m^2$/g) or less.

As such, when a silicon-containing material having a small amount of surface water is used as a raw material to be treated with a silane coupling agent, even a relatively small amount of a silane coupling agent can be adhered to the surface of silicon-containing material particles, and the thickness of the surface layer can be made smaller.

In order to obtain a silicon-containing material having an amount of surface water per unit specific surface area (200° C. to 300° C.) of 0.1 ppm/($m^2$/g) to 20 ppm/($m^2$/g), for example, the silicon-containing material may be dried before using it as a raw material, or may be subjected to a pulverization treatment in an inert gas atmosphere (for example, nitrogen gas).

Figure 2:
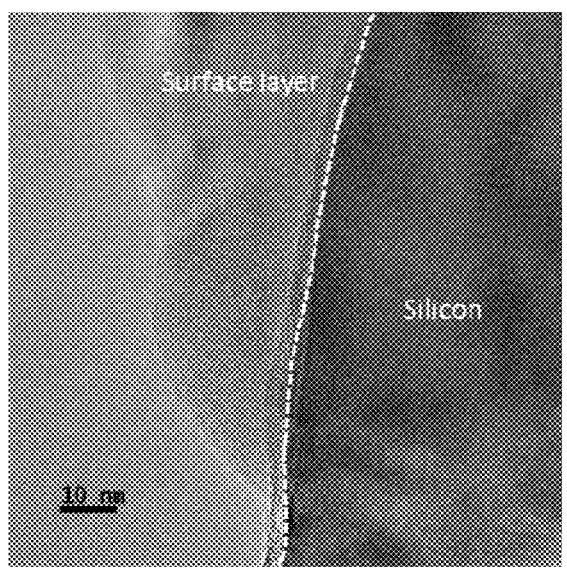
FIG. 2 is a cross-sectional photograph similarly obtained, in relation to the negative electrode obtained in Example 2, by observing another site of the surface area of the active material particles in a vertical cross-section of the active material layer using a transmission electron microscope.

Regarding the atomization method, for example, it is preferable to employ a method of micronizing a molten metal dropped into a cooling medium by utilizing the pressure wave generated by inducing boiling by spontaneous nucleation, using the apparatus described in FIG. 2 of WO 01/081033 (this micronization method is referred to as a "steam explosion atomization method" in the present specification). However, the present invention is not intended to be limited to such an atomization method.

The surface treatment is preferably carried out by performing a surface treatment for increasing dispersibility of the active material using a silane coupling agent or the like.

At this time, the silane coupling agent may be any organic silicon compound having an organic functional group and a hydrolysable group in the molecule, and among others, a silane coupling agent containing an organosilicon compound having an amino group in a side chain is preferred.

When the surface treatment of the active material is carried out using a silane coupling agent or the like, it is preferable to dry the active material by heating in order to volatilize the solvent. The temperature at this time is preferably set to, for example, 40° C. to 120° C.

<Negative Electrode>

The negative electrode related to this exemplary embodiment (hereinafter, referred to as "present negative electrode") is a negative electrode for nonaqueous electrolyte secondary batteries, in which a coating film containing the present negative electrode active material, a binder, optionally a conductive material, and optionally graphite as a negative electrode active material is provided on a current collector.

(Binder)

Regarding the binder, any of a polyimide, a polyamide and a polyamideimide may be used. These may be used singly, or two or more kinds thereof may be used in combination (hereinafter, these may also be collectively referred to as "polyimide and the like"). A binder other than these may also be used in combination therewith.

Regarding the polyimide and the like described above, commercially available products can be used without limitations. Particularly for the polyamide, it is preferable to use a polyamide having a glass transition point Tg of 200° C. to 400° C. Also for the polyamideimide, it is preferable to use a polyamideimide having a glass transition point Tg of 200° C. to 400° C.

It is preferable that the polyimide and the like described above be fixed to at least a portion of the surface of the negative electrode active material particles (hereinafter, when simply described as "active material particles", this means "negative electrode active material particles").

A particularly preferred embodiment of the form of fixation of the polyimide and the like is a form in which the polyimide and the like are fixed planarly in at least a portion of the surface of the active material particles. The term "planarly" has the same meaning as film-like, and means a state that is opposite to the state in which objects are scattered in a dotted fashion. Furthermore, the term "fixation" means a state in which the active material particles and the polyimide and the like are bonded in a state in which a mechanical bonding force (for example, an anchoring effect such as engagement or interdigitation) or a chemical bonding force is generated. A state in which the active material particles and the polyimide and the like are simply mixed, and consequently the two components are only in contact with each other, does not correspond to "fixation".

The method for fixing the polyimide and the like planarly onto the surface of the active material particles will be described below.

It is preferable that the polyimide and the like do not cover the entirety of the surface of the active material particles, but be fixed to the surface in the form in which there are areas where the polyimide and the like are not fixed, remaining on the surface of the active material particles. Furthermore, it is preferable that adjacent active material particles are in contact with each other in the areas where the polyimide and the like are not fixed, and at the same time, the polyimide and the like are fixed and connected to the periphery of the contact points. As such, electron conductivity can be secured by bringing the active material particles into contact through areas where the polyimide and the like are not fixed.

It is preferable that the polyimide and the like that are fixed planarly to the surface of the active material particles, are connected integrally through the connection sites formed by the polyimide and the like that are fixed to the surface of other active material adjoining the relevant particles. That is, as discussed above, the active material particles are preferably such that adjacent particles are in contact with each other, and also, the polyimide and the like that are fixed to the periphery of the contact points thereof are connected to each other and form connection sites.

The connection sites formed by the polyimide and the like can be elongated while maintaining a fixed state with the particles when lithium ions are inserted into the active material particles, and thus the active material particles undergo expansion. Thereby, detachment of the active material particles from the active material layer caused by expansion is effectively prevented, and the cycle characteristics at the time of charging and discharging are enhanced. Furthermore, this also contributes to the suppression of increase in the thickness of the battery resulting from charging. Suppression of increase in the thickness of the battery resulting from charging is particularly effective when the negative electrode of the present invention is applied to a battery that is used in a place where the battery storage space is limited, as in the case of the battery for mobile telephones. On the other hand, when lithium ions are released from the active material particles due to discharging, the particles undergo contraction. Therefore, the connection sites can also under contraction along with the contraction of the particles. As such, since the connection sites formed by the polyimide and the like are connecting between the active material particles in a manner similar to that of a spring, the particles are effectively prevented from being detached from the active material layer.

In addition to that the active material particles are connected with each other through connection sites formed by the polyimide and the like, it is more preferable that plural active material particles are connected in a rosary shape through the connection sites described above. At this time, the rosary-like connection may be a straight form, or may be a meandering form. Also, the rosary-like connection may be in a literally cyclic form, or may be in a non-cyclic form.

In addition, the rosary-like connection may be in the form of a single line, or may be in a branched form. When plural active material particles are connected in a rosary shape, the increase in volume caused by expansion of the active material particles is further relieved by the rearrangement of the rosary-like connection, and the increase in the thickness of the battery resulting from charging is further suppressed.

In order to have plural active material particles connected in a rosary shape as such, for example, a negative electrode mixture may be applied on a current collector, and then, as will be described below, the negative electrode mixture may be dried by heating at a relatively low temperature. However, the present invention is not intended to be limited to this method. It is speculated to be possibly such that when the negative electrode mixture is not dried rapidly but is dried mildly, there occur pathways through which the solvent is volatilized, and the active material particles are arranged along these pathways.

The proportion of the polyimide contained in the active material layer is preferably 1 mass % to 15 mass %, particularly more preferably 2 mass % or more, or 10 mass % or less, relative to the mass of the active material particles.

(Conductive Material)

Regarding the conductive material, for example, a fine metal powder or a powder of a conductive carbon material such as acetylene black can be used. In the case of using a fine metal powder as the conductive material, it is preferable to use a fine powder of a metal having lithium ion conductivity, such as Sn, Zn, Ag or In, or of an alloy of these metals.

(Graphite)

By adding graphite as a negative electrode active material to the present negative electrode active material, increase in capacity attributable to silicon, and satisfactory cycle characteristics attributable to graphite can be both obtained.

(Mixing Composition)

The content of the binder in the present negative electrode is preferably 1 part to 15 parts by mass, and particularly preferably 2 parts by mass or more, or 10 parts by mass or less, relative to 100 parts by mass of the present negative electrode active material.

Furthermore, in the case of incorporating a conductive material, the content of the conductive material is preferably 1 part to 10 parts by mass, and particularly preferably 2 parts by mass or more, or 5 parts by mass or less, relative to 100 parts by mass of the present negative electrode active material.

Furthermore, in the case of incorporating graphite as a negative electrode active material, the content of graphite is preferably such that the mixing mass ratio of the present negative electrode active material and graphite is 0.5:95 to 50:50, and particularly 10:90.

(Method for Producing Present Negative Electrode)

The present negative electrode can be formed by mixing the present negative electrode active material (particulate), a binder, a conductive material, and a solvent to prepare a negative electrode mixture, applying this negative electrode mixture on the surface of a current collector formed from Cu or the like, drying the negative electrode mixture to thereby form a negative electrode active material layer, and then pressing the active material layer if necessary.

Regarding the drying after the application of the negative electrode mixture on the surface of a current collector, it is preferable to conduct drying in a non-oxygen atmosphere, for example, in an argon atmosphere, for 1 hour to 10 hours, and particularly for 1 hour to 7 hours.

Here, the method for producing the present negative electrode in the case of using a polyimide as the binder will be explained.

First, the present negative electrode active material (particulate), a polyimide precursor compound, an organic solvent such as N-methyl-2-pyrrolidone, and optionally a conductive material such as a fine metal powder or acetylene black are mixed, thereby a negative electrode mixture is prepared, and this negative electrode mixture is applied on the surface of a current collector formed from Cu or the like.

At this time, polyamic acid (polyamide acid) can be used as the polyimide precursor compound.

When the negative electrode mixture is applied on the surface of a current collector, the negative electrode mixture is heated to a temperature of preferably higher than 300° C., particularly 310° C. or higher, and among others, preferably 315° C. or higher, to thereby volatilize the organic solvent, and also, the polyimide precursor compound is polymerized. Thus, a polyimide can be obtained.

At this time, by regulating the polymerization conditions for the relevant precursor compound, the polyimide can be fixed planarly to the surface of the active material particles, and the active material can be connected in a rosary shape through the connection sites formed by the polyimide.

Regarding the polymerization conditions for the precursor compound, it has been found as a result of the investigations of the inventors of the present invention that it is advantageous to carry out heating in multiple stages. Particularly, it is advantageous to carry out heating in at least two stages, suitably in at least three stages, and more preferably in four stages. For example, in the case of performing heating in two stages, it is preferable to perform heating of a first stage at 100° C. to 150° C., and it is preferable to perform heating of a second stage at a temperature higher than 300° C., for example, at 310° C. to 400° C.

In regard to the heating time, it is preferable to set the heating time of the first stage to be equal to the heating time of the second stage, or to be longer than the heat time of the second stage. For example, it is preferable to set the heating time of the first stage to 120 minutes to 300 minutes, and particularly preferably to 180 minutes or longer, or 240 minutes or shorter, and to set the heating time of the second stage to 30 minutes to 120 minutes, and particularly preferably to 30 minutes to 60 minutes.

In the case of performing heating in three stages, it is preferable to employ a heating temperature that is intermediate between the temperatures of the first stage and the second stage in relation to the heating of two stages as described above.

This intermediate heating is preferably carried out at 150° C. to 190° C. It is preferable to set the heating time to be equal to the time of the first stage and the second stage, or to a time period that is intermediate between the heating times of the first stage and the second stage. That is, in the case of performing heating in three stages, it is preferable to set the heating times of the various stages to be equal, or to shorten the heating time as the stage progresses.

Furthermore, in the case of performing heating in four stages, it is preferable to employ a heating temperature higher than that of the third stage.

It is preferable to perform heating in an inert atmosphere of argon or the like, regardless of how many stages heating is carried out. In the final stage, it is preferable to perform heating at a temperature higher than 300° C., and particularly 310° C. or higher.

Furthermore, at the time of conducting the heating treatment, it is preferable to press the active material layer with a pressing member such as a glass plate. It is because when the active material layer is treated in this manner, polyamic acid can be polymerized in a state in which the organic solvent is abundant, that is, in a state as if the polyamic acid is saturated in the organic solvent, and therefore, the molecular chains of the polyimide thus produced are easily entangled.

When multistage heating is carried out as described above, the organic solvent contained in the negative electrode mixture can be gradually volatilized. Accordingly, the polyamide precursor compound can be made to have a sufficiently high molecular weight, and also, the polyimide can be fixed over a wide range of the surface of the active material particles. Also, voids can be formed inside the active material layer in the form of a three-dimensional network extending over the entirety of the thickness direction of the layer.

Meanwhile, also in the case of using a polyamide or a polyamideimide, a heat treatment can be carried out similarly to the case of the polyimide. However, when a polyamide or a polyamideimide is used, it is preferable to form an active material layer by applying a negative electrode mixture containing a polyamide or a polyamideimide and particles of the active material on the surface of a current collector, and then drying the coating film by heating in a temperature range of Tg−100° C. to Tg+100° C. (wherein Tg represents the glass transition point of the polyamide or polyamideimide), and particularly in a temperature range of Tg−100° C. to Tg. It has been found as a result of investigations carried out by the inventors of the present invention that the cycle characteristics are further enhanced by performing drying as such. A further enhancement of the cycle characteristics becomes more noticeable when the drying process described above is carried out in a temperature range of Tg−50° C. to Tg+50° C., particularly in a temperature range of Tg−50° C. to Tgm, and among others, at a temperature higher than 300° C., for example, in a temperature range of 310° C. or higher.

The glass transition point of the polyamide or polyamideimide is measured using a TG-DTA6200 (manufactured by Seiko Instruments, Inc.) in an argon atmosphere, by setting the scan speed at 5° C./min.

<Nonaqueous Electrolyte Secondary Battery>

The nonaqueous electrolyte secondary battery related to this exemplary embodiment (referred to as "present secondary battery") may be configured to include the present negative electrode, a positive electrode, a separator, a nonaqueous electrolyte, and the like. This secondary battery can be used as a so-called lithium secondary battery.

(Positive Electrode)

A positive electrode has, for example, a positive electrode active material layer formed on at least one surface of a current collector. The positive electrode active material layer contains a positive electrode active material. Regarding the positive electrode active material, any active material conventionally known in the pertinent technical field can be used without any particular limitations. For example, various lithium-transition metal composite oxides can be used. Examples of such materials include $LiCoO_2$, $LiNiO_2$, $LiMnO_2$, $LiMn_2O_4$, $LiCo_{1/3}Ni_{1/3}Mn_{1/3}O_2$, $LiCo_{0.5}Ni_{0.5}O_2$, $LiNi_{0.7}Co_{0.2}Mn_{0.1}O_2$, $Li(Li_xMn_{2x}Co_{1-3x})O_2$ (wherein $0<x<1/3$), $LiFePO_4$, and $LiMn_{1-z}M_zPO_4$ (wherein $0<z\leq0.1$, and M represents at least one metal element selected from the group consisting of Co, Ni, Fe, Mg, Zn, and Cu).

(Separator)

Regarding the separator that is used together with the negative electrode and the positive electrode, a non-woven fabric made of a synthetic resin, porous films of polyolefins such as polyethylene or polypropylene, or of polytetrafluoroethylene, and the like are preferably used.

(Nonaqueous Electrolyte)

A nonaqueous electrolyte is formed from a solution in which a lithium salt as a supporting electrolyte is dissolved in an organic solvent. Regarding the organic solvent, for example, use is made of one kind or a combination of two or more kinds of carbonate-based organic solvents such as ethylene carbonate, propylene carbonate, dimethyl carbonate, methyl ethyl carbonate, and diethyl carbonate; and fluorine-based organic solvents obtained by partially fluorinating the carbonate-based organic solvents, such as fluoroethylene carbonate. Specifically, fluoroethylene carbonate, diethyl fluorocarbonate, dimethyl fluorocarbonate, and the like can be used. Examples of the lithium salt include $CF_3SO_3Li$, $(CF_3SO_2)NLi$, $(C_2F_5SO_2)_2NLi$, $LiClO_4$, $LiAlCl_4$, $LiPF_6$, $LiAsF_6$, $LiSbF_6$, $LiCl$, $LiBr$, $LiI$, and $LiC_4F_9SO_3$. These can be used singly or in combination of two or more kinds thereof.

<Explanation of Terms>

When the expression "X to Y" (X and Y being arbitrary numbers) is used in the present specification, unless particularly stated otherwise, the expression includes the meaning of "X or more and Y or less", as well as the meaning of "preferably more than X" or "preferably less than Y".

Furthermore, when the expression "X or more" (X being an arbitrary number) or "Y or less" (Y being an arbitrary number) is used, the meaning to the effect of "being preferably more than X" or "being preferably less than Y" is also included.

EXAMPLES

Hereinafter, the present invention will be described in more detail by way of Examples. However, the scope of the present invention is not intended to be limited by such Examples.

Example 1

(1) Production of Negative Electrode Active Material

An ingot of silicon (Si) was heated to melt, and the molten liquid that had been heated to 1600° C. was subjected to steam explosion atomization using the apparatus described in FIG. 2 of WO 01/081033. At this time, the inner diameter of the cylindrical mixing nozzle 2 was set to 2.0 mm, and the amount of the coolant circulating in the mixing nozzle was set to 100 L/min. Water at room temperature was used as the coolant. A molten liquid of silicon was dropped (free-fall dropping) into the mixing nozzle 2 in an amount of 13 g each. The cooling rate at this time was estimated to be $10^6$ K/s to $10^8$ K/s according to the estimation method described above.

The silicon powder obtained by the steam explosion atomization was further subjected to particle size adjustment using a jet mill pulverizer in a nitrogen atmosphere (air in an amount of less than 1%, the balance being nitrogen vaporized from liquefied nitrogen (purity 99.999% or more), and thus a fine silicon powder having an amorphous shape (D50: 3.6 μm) was obtained.

The content of impurities in the fine silicon powder thus obtained was measured, and the total content of iron (Fe), aluminum (Al), calcium (Ca), phosphorus (P) and oxygen (O) was 0.77 mass %.

Furthermore, when the amount of surface water of the fine silicon powder thus obtained was measured, the amount of surface water (200° C. to 300° C.) was 23 ppm, the specific surface area of the fine silicon powder was 4.3 m²/g, and the amount of surface water per unit specific surface area (200° C. to 300° C.) was 5.4 ppm/(m²/g).

100 parts by weight of the fine silicon powder obtained as described above, 1 part by weight of 3-aminopropyltrimethoxysilane as a surface treatment agent, and 1.4 parts by weight of ethanol as a solvent were mixed using a cutter mill ("MIXER 720G" manufactured by Iwatani Corp.). Subsequently, the fine silicon powder thus mixed was subjected to a heat treatment at 100° C. for one hour in a vacuum, and thus a surface-treated silicon powder (D50: 3.3 μm), that is, a negative electrode active material (powder) was obtained.

(2) Preparation of Negative Electrode Mixture 100 parts by mass of the surface-treated silicon powder obtained as described above, 5 parts by mass of a conductive material (acetylene black), 5 parts by mass of a polyimide precursor compound (polyamic acid), and 100 parts by mass of N-methyl-2-pyrrolidone were mixed, and thus a negative electrode mixture was obtained.

(3) Production of Negative Electrode

The negative electrode mixture prepared as described above was applied on an electrolytic copper foil so as to obtain a coating film thickness of 12 μm. Subsequently, the coating film was heated in an argon atmosphere under reduced pressure, and polymerization of the precursor compound was carried out. Thus, a negative electrode was produced.

Heating was carried out in four stages. Heating of a first stage was carried out at 120° C. for 4 hours, heating of a second stage was carried out at 150° C. for 1 hour, heating of a third stage was carried out at 200° C. for 1 hour, and heating at a fourth stage was carried out at 310° C. for 1 hour. During heating, the current collector having the coating film formed thereon was sandwiched between two sheets of glass plates.

For the negative electrode obtained as described above, active material particles in a vertical cross-section of the active material layer were observed with a transmission electron microscope (JEM-ARM200F manufactured by JEOL, Ltd.), and partial presence of a surface layer having a thickness of 5 nm on the surface of particles of the active material formed of silicon was confirmed. This surface layer was analyzed by EDX, and it was found that the surface layer contained oxygen, silicon and carbon.

Furthermore, the vicinity of the interface of the current collector in a vertical cross-section of the active material layer was observed with a scanning microscope, and the polyimide was fixed planarly to the surface of the active material particles formed of silicon. Furthermore, adjoining active material particles were in contact with each other, and also, adjoining active material particles were connected by connection sites formed by polyimide, into a rosary form.

Furthermore, the active material particles and the current collector were also connected by the connection sites formed by polyimide.

Example 2

A fine silicon powder was produced in the same manner as in Example 1. However, a silicon fine powder of a production lot different from that of Example 1 was employed. The impurities content of this fine silicon powder was the same as that of the fine silicon powder of Example 1; however, the amount of surface water (200° C. to 300° C.) was 17 ppm, the specific surface area of the fine silicon powder was 2.4 m$^2$/g, and the amount of surface water per unit specific surface area (200° C. to 300° C.) was 6.9 ppm/(m$^2$/g).

Then, a surface-treated silicon powder (negative electrode active material), a negative electrode mixture, and a negative electrode were produced in the same manner as in Example 1, except that in the process of the surface coating treatment, 2-aminopropyltriethoxysilane was used as the surface treatment agent.

The D50 of the surface-treated silicon powder at this time was 3.5 µm.

For the negative electrode obtained as described above, the active material particles in a vertical cross-section of the active material layer were observed with a transmission electron microscope (JEM-ARM200F manufactured by JEOL, Ltd.), and partial presence of a surface layer having a thickness of 5 nm on the surface of particles of the active material formed of silicon was confirmed. This surface layer was analyzed by EDX, and it was found that the surface layer contained oxygen, silicon, and carbon.

Furthermore, the vicinity of the interface of the current collector in a vertical cross-section of the active material layer was observed with a scanning microscope, and the polyimide was fixed planarly to the surface of the active material particles formed of silicon. Furthermore, adjoining active material particles were in contact with each other, and also, adjoining active material particles were connected by connection sites formed by polyimide, into a rosary form. Furthermore, the active material particles and the current collector were also connected by the connection sites formed by polyimide.

Example 3

A fine silicon powder of the same production lot as that of Example 2 was employed. A surface-treated silicon powder (negative electrode active material), a negative electrode mixture, and a negative electrode were produced in the same manner as in Example 1, except that in the process of the surface coating treatment, 2-aminopropyltriethoxysilane was used as the surface treatment agent, while the number of parts added thereof was adjusted to 2.0 parts by weight, and ethanol was used as the solvent, while the number of parts added thereof was adjusted to 2.8 parts by weight. The D50 of the surface-treated silicon powder at this time was 3.7 µm.

For the negative electrode obtained as described above, the active material particles in a vertical cross-section of the active material layer were observed with a transmission electron microscope (JEM-ARM200F manufactured by JEOL, Ltd.), and partial presence of a surface layer having a thickness of 7 nm on the surface of particles of the active material formed of silicon was confirmed. This surface layer was analyzed by EDX, and it was found that the surface layer contained oxygen, silicon, and carbon.

Furthermore, the vicinity of the interface of the current collector in a vertical cross-section of the active material layer was observed with a scanning microscope, and the polyimide was fixed planarly to the surface of the active material particles formed of silicon. Furthermore, adjoining active material particles were in contact with each other, and also, adjoining active material particles were connected by connection sites formed by polyimide, into a rosary form. Furthermore, the active material particles and the current collector were also connected by the connection sites formed by polyimide.

Example 4

A fine silicon powder of the same production lot as that of Example 1 was employed, and a surface-treated silicon powder (negative electrode active material) and a negative electrode mixture were produced in the same manner as in Example 1.

Then, a negative electrode was produced in the same manner as in Example 1, except that a copper foil having the surface treated with 3-aminopropyltrimethoxysilane was used as the electrolytic copper foil for applying the negative electrode mixture thereon.

For the negative electrode obtained as described above, the active material particles in a vertical cross-section of the active material layer were observed with a transmission electron microscope (JEM-ARM200F manufactured by JEOL, Ltd.), and partial presence of a surface layer having a thickness of 5 nm on the surface of particles of the active material formed of silicon was confirmed. This surface layer was analyzed by EDX, and it was found that the surface layer contained oxygen, silicon, and carbon.

Furthermore, the vicinity of the interface of the current collector in a vertical cross-section of the active material layer was observed with a scanning microscope, and the polyimide was fixed planarly to the surface of the active material particles formed of silicon. Furthermore, adjoining active material particles were in contact with each other, and also, adjoining active material particles were connected by connection sites formed by polyimide, into a rosary form. Furthermore, the active material particles and the current collector were also connected by the connection sites formed by polyimide.

Example 5

A fine silicon powder of the same production lot as that of Example 2 was employed. A surface-treated silicon powder (negative electrode active material), a negative electrode mixture, and a negative electrode were produced in the same manner as in Example 1, except that in the process of the surface coating treatment, n-octyltriethoxysilane was used as the surface treatment agent. The D50 of the surface-treated silicon powder at this time was 3.3 µm.

For the negative electrode obtained as described above, the active material particles in a vertical cross-section of the active material layer were observed with a transmission electron microscope (JEM-ARM200F manufactured by JEOL, Ltd.), and partial presence of a surface layer having a thickness of 8 nm on the surface of particles of the active material formed of silicon was confirmed. This surface layer was analyzed by EDX, and it was found that the surface layer contained oxygen, silicon, and carbon.

Furthermore, the vicinity of the interface of the current collector in a vertical cross-section of the active material layer was observed with a scanning microscope, and the polyimide was fixed planarly to the surface of the active material particles formed of silicon. Furthermore, adjoining active material particles were in contact with each other, and also, adjoining active material particles were connected by connection sites formed by polyimide, into a rosary form. Furthermore, the active material particles and the current collector were also connected by the connection sites formed by polyimide.

Comparative Example 1

A fine silicon powder (negative electrode active material), a negative electrode mixture, and a negative electrode were produced in the same manner as in Example 1, except that the process of surface treatment was not carried out. Meanwhile, a fine silicon powder of the same production lot as that of Example 1 was employed.

The D50 of the fine silicon powder at this time was 3.6 μm.

Comparative Example 2

A fine silicon powder (negative electrode active material), a negative electrode mixture, and a negative electrode were produced in the same manner as in Comparative Example 1, except that a copper foil having the surface treated with 3-aminopropyltrimethoxysilane was used as the electrolytic copper foil for applying the negative electrode mixture thereon. A fine silicon powder of the same production lot as that of Example 1 was employed.

Comparative Example 3

A surface-treated silicon powder (negative electrode active material), a negative electrode mixture, and a negative electrode were produced in the same manner as in Example 1, except that pure silicon (D50: 5 μm) manufactured by Kojundo Chemical Laboratory Co., Ltd. was used as the fine silicon powder. The D50 of the surface-treated silicon powder was 6.4 μm.

When the amount of surface water of the pure silicon was measured, the amount of surface water per unit specific surface area (200° C. to 300° C.) was 22 ppm/(m$^2$/g).

Example 6

10 parts by mass of the same surface-treated silicon powder (negative electrode active material) as that of Example 2, 90 parts by mass of graphite (negative electrode active material), 5 parts by mass of a conductive material (acetylene black), 5 parts by mass of a polyimide precursor compound (polyamic acid), and 100 parts by mass of N-methyl-2-pyrrolidone were mixed, and thus a negative electrode mixture was obtained. Except for this, a negative electrode mixture and a negative electrode were produced in the same manner as in Example 2. The D50 of the surface-treated silicon powder used at this time was 3.5 μm.

For the negative electrode obtained as described above, the active material particles in a vertical cross-section of the active material layer were observed with a transmission electron microscope (JEM-ARM200F manufactured by JEOL, Ltd.), and partial presence of a surface layer having a thickness of 5 nm on the surface of particles of the active material formed of silicon was confirmed. This surface layer was analyzed by EDX, and it was found that the surface layer contained oxygen, silicon, and carbon.

Example 7

A fine silicon powder was produced in the same manner as in Example 1. However, a fine silicon powder was obtained under pulverization conditions that were different from those of Example 1 (D50: 0.6 μl). The impurities content of this fine silicon powder was the same as that of the fine silicon powder of Example 1; however, the amount of surface water (200° C. to 300° C.) was 170 ppm, the specific surface area of the fine silicon powder was 12.1 m$^2$/g, and the amount of surface water per unit specific surface area (200° C. to 300° C.) was 14 ppm/(m$^2$/g).

Then, for the process of the surface coating treatment, 2-aminopropyltriethoxysilane was used as the surface treatment agent, while the number of parts added thereof was set to 2.5 parts by weight, and ethanol was used as the solvent, while the number of parts added thereof was set to 3.5 parts by weight.

Furthermore, at the time of preparing the negative electrode mixture, 10 parts by mass of the surface-treated silicon powder (negative electrode active material), 90 parts by mass of graphite (negative electrode active material), 5 parts by mass of a conductive material, 5 parts by mass of a polyimide precursor compound (polyamic acid), and 100 parts by mass of N-methyl-2-pyrrolidone were mixed, and thus a negative electrode mixture was obtained.

Except for this, a surface-treated silicon powder (negative electrode active material), a negative electrode mixture, and a negative electrode were produced in the same manner as in Example 1.

The D50 of the surface-treated silicon powder at this time was 0.7 μm.

For the negative electrode obtained as described above, the active material particles in a vertical cross-section of the active material layer were observed with a transmission electron microscope (JEM-ARM200F manufactured by JEOL, Ltd.), and partial presence of a surface layer having a thickness of 8 nm on the surface of particles of the active material formed of silicon was confirmed. This surface layer was analyzed by EDX, and it was found that the surface layer contained oxygen, silicon, and carbon.

Comparative Example 4

10 parts by mass of a silicon powder that had not been surface-treated (negative electrode active material), 90 parts by mass of graphite (negative electrode active material), 5 parts by mass of a conductive material (acetylene black), 5 parts by mass of a polyimide precursor compound (polyamic acid), and 100 parts by mass of N-methyl-2-pyrrolidone were mixed, and a negative electrode mixture was obtained. Except for this, a negative electrode mixture and a negative electrode were produced in the same manner as in Example 2. The D50 of the surface-treated silicon powder used at this time was 3.6 μm.

<Method for Measuring Amount of Impurities>

For the fine silicon powders (before the silane coupling treatment) obtained in Examples and Comparative Examples, the contents of iron (Fe), aluminum (Al), calcium (Ca), phosphorus (P), and oxygen (O) were measured using an emission spectrochemical analyzer (ICP) and an oxygen nitrogen analyzer (EMGA-620W manufactured by Horiba, Ltd.).

<Measurement of Amount of Carbon in Surface Layer>

For the fine silicon powders (before the silane coupling treatment) and the negative electrode active materials (after the silane coupling treatment) respectively obtained in Examples and Comparative Examples, the contents of carbon (C) were measured using an oxygen nitrogen analyzer (EGMA-620W manufactured by Horiba, Ltd.), and the amount of carbon in the surface layer was calculated from the difference between the two values.

<Measurement of D50>

For each of the measurement samples (powders), the particle size distribution (dry method) was measured using a laser diffraction particle size distribution analyzer "MT3000II" manufactured by Nikkiso Co., Ltd., by dispersing and suctioning a sample (powder) at a dispersed compressed air pressure of 0.414 MPa using an automated sample supplier for a laser diffraction particle size distribution analyzer ("MICROTRAC SDC" manufactured by Nikkiso Co., Ltd.), and the D50 was determined from the volume-based particle size distribution chart thus obtained.

Meanwhile, the particle penetrability conditions of the analysis were set to be reflective, the shape was assumed to be non-spherical, the measurement range was set to 0.133 µm to 704.0 µm, and the measurement time was set to 30 seconds. The average value obtained by two measurements under these conditions was designated as the D50.

<Specific Surface Area>

For a measurement sample (powder), 0.5 g of the sample (powder) was weighed in a glass cell for a fluidized bed gas adsorption type specific surface area analyzer MONOSORB LOOP ("product name: MS-18" manufactured by Yuasa Ionics, Inc.), and the glass cell was purged with nitrogen gas at a gas amount of 30 mL/min for 5 minutes in a pretreatment apparatus for the MONOSORB LOOP. Subsequently, the sample was subjected to a heat treatment at 250° C. for 10 minutes in the nitrogen gas atmosphere. Thereafter, the sample (powder) was analyzed by a one-point BET method using the MONOSORB LOOP.

For the adsorption gas at the time of analysis, a mixed gas of 30% of nitrogen and 70% of helium was used.

<Measurement of Thickness of Surface Layer of Active Material Particles and Identification of Existing Elements>

For each of the negative electrodes obtained in Examples and Comparative Examples, active material particles in a vertical cross-section of the active material layer were observed with a transmission electron microscope (JEM-ARM200F manufactured by JEOL, Ltd.), the thickness of the surface layer was measured at arbitrary 10 sites, and the average value was designated as the thickness of the surface layer. Also, this surface layer was analyzed by energy dispersive X-ray spectroscopy (EDX), and identification of existing elements was conducted.

<Measurement of Amount of Water According to Karl-Fischer Method>

For the amount of surface water of the fine silicon powders (before silane coupling treatment) obtained in Examples and Comparative Examples, the amount of water released when a fine silicon powder was heated up to 200° to 300° C. under the conditions described below was measured using a Karl-Fischer moisture meter described below, and thus the amount of water at 200° C. to 300° C. was determined.

Apparatus: Moisture vaporizing apparatus "KEMADP-611"/Karl-Fischer moisture meter "MKC-610-DJ"

Measurement: The amount of water at 200° C. was measured, subsequently the temperature was increased to 300° C., the amount of water at from 200° C. to 300° C. was measured, and thus the amount of water at 200° C. to 300° C. was determined.

Temperature increase: 10° C./min

Flow rate: argon at 70 mL/min

Reagent: HYDRANAL COULOMAT AG and HYDRANAL COULOMAT CG

On the other hand, regarding the amount of surface water of the negative electrode active materials (powders) obtained in Examples and Comparative Examples, the amount of water released when the negative electrode active material (powder) was heated to 120° C. to 300° C. under the conditions described below was measured using a Karl-Fischer moisture meter described below, and thus the amount of water at 120° C. to 300° C. was determined. This is indicated as "Amount of water (ppm) at 120° C. to 300° C." in the table.

Apparatus: Moisture vaporizing apparatus "KEMADP-611"/Karl-Fischer moisture meter "MKC-610-DJ"

Measurement: The amount of water at 120° C. was measured, subsequently the temperature was increased to 300° C., the amount of water at from 120° C. to 300° C. was measured, and thus the amount of water at 120° C. to 300° C. was determined.

Temperature increase: 10° C./min

Flow rate: argon at 70 mL/min

Reagent: HYDRANAL COULOMAT AG and HYDRANAL COULOMAT CG

<Evaluation of Fluidity>

5 g of each of the negative electrode active materials (powders) obtained in Example 1, Comparative Example 1 and Comparative Example 3 was placed on an edge of a plate having a size of 150 mm×300 mm. Subsequently, the plate was gradually lifted, and the angle at which the negative electrode active material (powder) began to slide was measured. An evaluation of fluidity was thus made.

<Evaluation of Battery Characteristics>

Lithium secondary batteries were produced using the negative electrodes obtained in Examples and Comparative Examples, and the capacity retention at the time of repeating charging and discharging, was measured. Thus, the cycle characteristics were evaluated.

(Production of Battery)

A solution obtained by dissolving 1 mol/L of $LiPF_6$ in a mixed solvent of ethylene carbonate and diethyl carbonate at a volume ratio of 1:1, was used as an electrolyte.

A polypropylene porous film was used as a separator. The negative electrode thus obtained was punched into a circle having a diameter of 14 mm, and was subjected to vacuum drying at 160° C. for 6 hours. Then, a 2032 coin cell was assembled in a glove box in an argon atmosphere.

Metal lithium was used as a counter electrode. A solution obtained by dissolving 1 mol/L of $LiPF_6$ in a mixed solvent of ethylene carbonate and diethyl carbonate at a volume ratio of 1:1, was used as an electrolyte. A polypropylene porous film was used as a separator.

(Charge-Discharge Conditions)

Charging was carried out in a constant current-constant voltage charging mode, at a constant current until the battery voltage reached 0.001 V. Thereafter, the time point when the current value decreased by constant voltage charging control was 0.02 C, and was defined as completion of charging.

Discharging was carried out at a constant current until the battery voltage reached 1.5 V.

The rate in the charge-discharge cycles was set to 0.1 C for the first cycle and to 0.2 C from the second cycle and on.

In regard to the evaluation of the charge-discharge cycle characteristics, the discharge capacities of various cycles in the case in which the discharge capacity of the second cycle was designated as 100%, were compared as the capacity retention.

In Examples 1 to 5 and Comparative Examples 1 to 3, 6.93 mA was designated as 1 C. Also, in Examples 6 and 7 and Comparative Example 4, 5.39 mA was designated as 1 C based on the surface capacity of the coated electrode of 3.5 mAh/cm$^2$. The respective current values of the C rates were calculated based on the current value of that 1 C, and these values were used for the evaluation of the capacity retention.

TABLE 1

| | D50 (dry type) | Surface layer | | Specific surface area (m$^2$/g) | Amount of water 120-300 (ppm) | Amount of water/BET (ppm/(m2/g)) | Capacity retention [%] after 40 cycles |
| | | Thickness (nm) | Amount of carbon (wt %) | | | | |
|---|---|---|---|---|---|---|---|
| Example 1 | 3.3 | 5.0 | 0.1 | 3.97 | 679 | 171 | 79 |
| Example 2 | 3.5 | 5.0 | 0.1 | 2.51 | 380 | 151 | 80 |
| Example 3 | 3.7 | 7.0 | 0.2 | 2.51 | 450 | 179 | 77 |
| Example 4 | 3.5 | 5.0 | 0.1 | 3.97 | 679 | 171 | 80 |
| Example 5 | 3.3 | 8.0 | 0.2 | 2.71 | 268 | 99 | 74 |
| Comparative Example 1 | 3.6 | 0.0 | — | 4.28 | 131 | 31 | 63 |
| Comparative Example 2 | 3.6 | 0.0 | — | 4.28 | 93 | 22 | 66 |
| Comparative Example 3 | 6.4 | 11.0 | 0.5 | 1.28 | 367 | 286 | 67 |

TABLE 2

| | D50 (dry type) | Surface layer | | Specific surface area (m$^2$/g) | Amount of water 120-300 (ppm) | Amount of water/BET (ppm/(m2/g)) | Capacity retention [%] after 40 cycles |
| | | Thickness (nm) | Amount of carbon (wt %) | | | | |
|---|---|---|---|---|---|---|---|
| Example 6 | 3.5 | 5.0 | 0.1 | 2.51 | 380 | 151 | 73 |
| Example 7 | 0.7 | 7.0 | 0.3 | 11.90 | 946 | 79 | 97 |
| Comparative Example 4 | 3.6 | 0.0 | — | 4.28 | 131 | 31 | 61 |

DISCUSSION

The measurement results for the negative electrode active materials obtained in Examples and Comparative Examples are presented in Table 1.

As is obvious from Table 1, it was found that when the negative electrode active materials obtained in various Examples were used, the charge-discharge cycle characteristics became more satisfactory compared with the case of using the negative electrode active materials obtained in Comparative Examples.

Furthermore, an evaluation of fluidity was carried out for the negative electrode active materials (powders) obtained in Examples and Comparative Examples. As a result, while the negative electrode active material (powder) obtained in Example 1 slid and fell at 10°, the negative electrode active materials (powders) obtained in Comparative Example 1 and Comparative Example 3 began to slide when the plates were lifted to 20°. From this, it was found that fluidity of the negative electrode active materials (powders) was enhanced by providing a surface layer. That is, it is speculated that dispersibility (uniform miscibility) of the negative electrode active material (powder) at the time of slurry production is enhanced.

Based on the above-discussed results, it is contemplated that for a negative electrode active material (powder) having a D50 of at least 0.1 μm to 5.0 μm, when a surface layer was provided on the negative electrode active material, fluidity was enhanced, that is, dispersibility (uniform miscibility) of the active material particle powder was enhanced at the time of slurry production, and the interior of the electrode coating film became uniform so that the cycle characteristics were improved.

The invention claimed is:

1. A negative electrode active material for nonaqueous electrolyte secondary batteries, the negative electrode active material containing silicon and comprising negative electrode active material particles that have a D50 based on a volume-based particle size distribution obtainable by measurement by a laser diffraction scattering type particle size distribution analysis method, of 0.1 μm to 5.0 μm, and include a surface layer containing oxygen, silicon, and carbon over the entire surface or a portion of the active material surface, and an amount of water per unit specific surface area (120° C. to 300° C.) obtained by following measurement method is 50 ppm/(m$^2$/g) to 250 ppm/(m$^2$/g);

the measurement method of an amount of water per unit specific surface area comprising: heating the negative electrode active material at temperature increase rate of 10° C./min using a moisture vaporizing apparatus, the amount of water released when the active material is heated to 120° C. to 300° C. is measured using a moisture meter, and then the amount of water released when the active material was heated to 120° C. to 300° C. thus measured and obtained is calculated by dividing by the specific surface area, wherein the thickness of the surface layer is 0.1 nm to 10 nm, and the negative electrode active material particles further comprise an intermediate layer between the active material surface and the surface layer, wherein said intermediate layer comprises silicon dioxide as a main component, and said intermediate layer has a thickness of 0.1 nm to 2.0 nm.

2. The negative electrode active material for nonaqueous electrolyte secondary batteries according to claim 1, wherein a specific surface area is 1.0 m²/g to 15.0 m²/g.

3. The negative electrode active material for nonaqueous electrolyte secondary batteries according to claim 2, wherein an amount of carbon in the surface layer is 0.01 wt % to 0.5 wt % of the negative electrode active material particles.

4. The negative electrode active material for nonaqueous electrolyte secondary batteries according to claim 2, wherein a total content of iron (Fe), aluminum (Al), calcium (Ca), phosphorus (P) and oxygen (O) is 0.1 mass % to 2.5 mass %.

5. The negative electrode active material for nonaqueous electrolyte secondary batteries according to claim 1, wherein an amount of carbon in the surface layer is 0.01 wt % to 0.5 wt % of the negative electrode active material particles.

6. The negative electrode active material for nonaqueous electrolyte secondary batteries according to claim 5, wherein a total content of iron (Fe), aluminum (Al), calcium (Ca), phosphorus (P) and oxygen (O) is 0.1 mass % to 2.5 mass %.

7. The negative electrode active material for nonaqueous electrolyte secondary batteries according to claim 1, wherein a total content of iron (Fe), aluminum (Al), calcium (Ca), phosphorus (P) and oxygen (O) is 0.1 mass % to 2.5 mass %.

8. The negative electrode active material for nonaqueous electrolyte secondary batteries according to claim 1, wherein the negative electrode active material is obtainable according to a production method that includes a step of surface treating a silicon-containing material having an amount of surface water per unit specific surface area (200° C. to 300° C.) of 0.1 ppm/(m²/g) to 20 ppm/(m²/g), with a silane coupling agent.

9. The negative electrode active material for nonaqueous electrolyte secondary batteries according to claim 8, wherein the silane coupling agent includes an organosilicon compound having an amino group in a side chain.

10. A negative electrode for nonaqueous electrolyte secondary batteries, the negative electrode comprising the active material for nonaqueous electrolyte secondary batteries according to claim 1, and a binder.

11. The negative electrode for nonaqueous electrolyte secondary batteries according to claim 10, wherein the binder is a polyimide.

12. A nonaqueous electrolyte secondary battery, comprising a negative electrode according to claim 10.

13. A negative electrode for nonaqueous electrolyte secondary batteries, the negative electrode comprising the active material for nonaqueous electrolyte secondary batteries according to claim 1 as a first negative electrode active material, graphite as a second negative electrode active material, and a binder.

* * * * *